April 21, 1936.　　　　P. B. JOHNSON　　　　2,037,984

PISTON RING

Filed May 7, 1935

PAT B. JOHNSON
Inventor

By
Attorney

Patented Apr. 21, 1936

2,037,984

UNITED STATES PATENT OFFICE 2,037,984

PISTON RING

Pat B. Johnson, Charlotte, N. C.

Application May 7, 1935, Serial No. 20,223

2 Claims. (Cl. 309—45)

This invention relates to an improved piston ring adapted to be used in the pistons of internal combustion engines and more especially to an oil ring to prevent an excessive amount of oil from reaching the combustion chamber.

It is an object of this invention to provide a combination piston ring, which is really two rings in one, in that it has two oil scavenging sections for wiping the oil from the walls of the cylinder in which it is adapted to operate and passing the oil back inside the pistons and to the crank case of an internal combustion engine.

It is another object of this invention to provide a piston ring having two grooves therein and having each a set of holes leading from the groove inwardly and having communication with the interior of the piston whereby the oil will be wiped from the side walls of the cylinder in which the piston is reciprocating and returned to the crank case and thus the oil will be prevented from going into the combustion chamber in too great a quantity, causing the formation of carbon, the fouling of spark plugs and the like.

It is a further object of this invention to provide an oil ring for pistons of internal combustion engines having a circumferential groove disposed approximately mid-way thereof and having the lower outer edge thereof cut away by means of a groove being formed in the lower outer edge thereof and each of these grooves has a plurality of holes, slots and the like, communicating with the groove in which the piston is mounted, which in turn, has a hole therethrough communicating with the groove whereby surplus oil is wiped by the said two grooves and passed through said holes or perforations and through the perforations in the pistons and returned to the crank case and thus is prevented from entering the compression chamber.

Some of the objects of the invention having been stated, other objects will appear as the description proceeds when taken in connection with the accompanying drawing, in which:—

Figure 1:
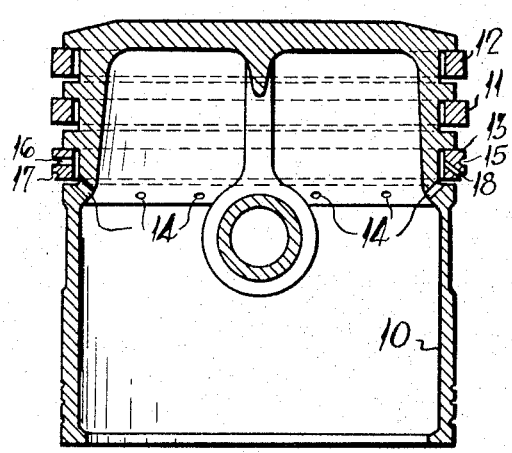
Figure 1 is a vertical sectional view through a piston showing my invention as applied thereto.
Figure 2:
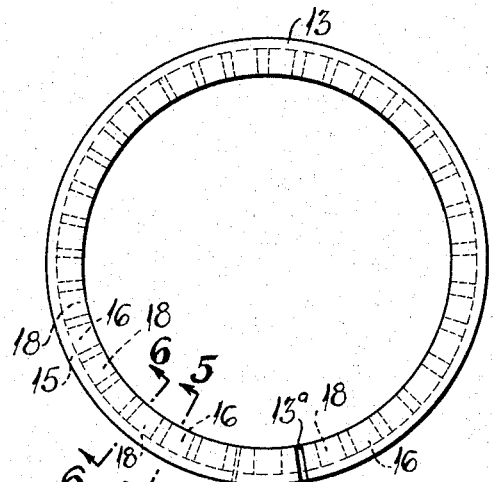
Figure 2 is a top plan view of my improved piston ring.
Figure 3:
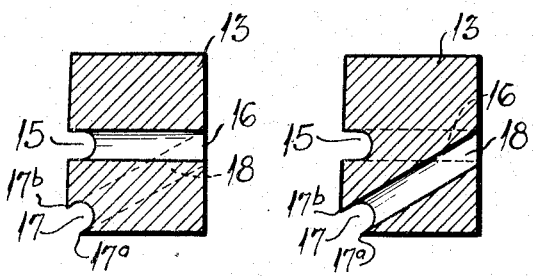
Figure 3 is a side elevation of the ring.
Figures 5, 6:
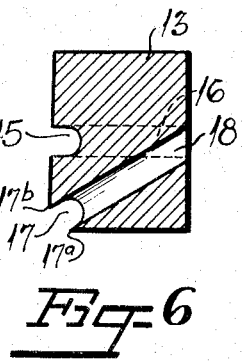
Figure 5 is a vertical sectional view taken along line 5—5 in Figure 2.
Figure 6 is a vertical sectional view taken along line 6—6 in Figure 2.
Figure 4:
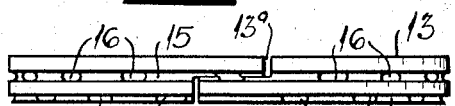
Figure 4 is an enlarged elevation of a portion of Figure 3.

Referring more specifically to the drawing, the numeral 10 indicates a conventional piston having the conventional compression rings 11 and 12 therein, which are mounted in suitable grooves in the piston and, as is usual, the lowermost groove in the piston has an oil ring therein. This oil ring 13 is of a special construction, and has a step-cut joint as at 13a.

It will be noted that the lower groove on the piston has a plurality of holes 14 penetrating the same whereby oil collected by the oil ring 13 may flow through the piston and be returned to the crank case. The idea of having holes 14 in a piston is not new and has been heretofore employed with other types of oil rings.

My improved oil ring comprises a groove 15 disposed circumferentially around the ring 13 and having a plurality of oblong slots 16 communicating with the bottom of said grooves and also communicating with the space between the inside of the ring 13 and the base of the groove in which it is mounted. The piston ring 13 also has milled in the lower outside corner thereof another circumferentially disposed groove 17 which likewise has a plurality of oblong slots 18 passing through the ring and communicating with the base of the groove in which the ring is mounted.

These oblong slots 18 project upwardly and deliver the surplus oil which is wiped from the cylinder wall by the side walls of groove 17 into approximately the same position as that to which the grooves or perforations 16 deliver the oil.

It is to be noted that in cutting away the groove 17 from the lower exterior corner of the ring that the portion 17a does not extend outwardly as far as the portion 17b, and therefore, 17a never touches the cylinder walls and thus portion 17b serves as a scraper to scrape the surplus oil from the cylinder wall.

If the holes 18 were not provided for the oil to pass through groove 17 carbon would soon form in the groove and since carbon is a very good conductor of heat the ring will become overheated and therefore lose its temper. By constructing the ring in this manner carbon does not form on the lower portion thereof, thereby protecting the ring from becoming easily overheated.

Figure 8:
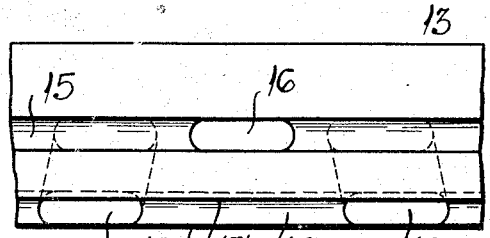
Figure 8 is a view looking at the lower edge of Figure 7 and showing the holes leading from the base of the groove in the piston ring to the groove in which the piston ring is mounted as being circular instead of oblong as in the other form of the invention.
Figure 7:
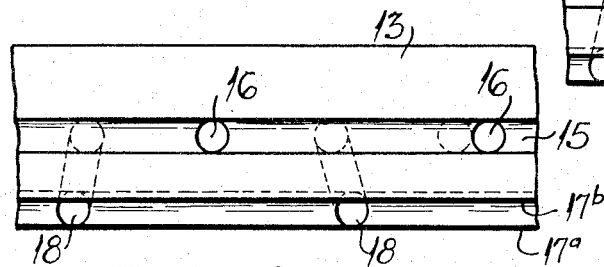
Figure 7 is a top plan view of a portion of a modified form of the ring.

In Figures 1 to 6 inclusive, the holes or perforations 16 and 18 are shown as being oblong. This has its advantages in that carbon collecting in the holes 16 and 18 will not tend to clog the holes as quickly as if they were round as shown in Figures 7 and 8. Therefore, the preferable form is that shown in Figures 1 to 6 inclusive, although the perforations may be round as shown in Figures 7 and 8, I prefer that the perforations or holes 16 and 18 not be long enough to create any vertical compressibility of the ring but merely to be wide enough to prevent carbon from clogging the same.

In the drawing and specification there has been set forth a preferred embodiment of the invention, and although specific terms are employed, they are used in a generic and descriptive sense only, and not for purposes of limitation, the scope of the invention being set forth in the appended claims.

I claim:

1. A piston ring having a circumferentially disposed groove therein and disposed approximately midway of its exterior surface with a plurality of horizontally disposed perforations communicating with the base of the groove, having their outlets approximately at a midway point on the interior surface of the ring, said ring also having a second circumferentially extending groove cut from the lower exterior edge thereof and having a plurality of other holes communicating with said second groove extending through the ring upwardly with their outlets approximately at a midway point on the interior surface of the ring to form communication between the base of the second groove and the interior surface of the ring, said other holes alternating with said perforations, the upper edge of said second groove forming an acute angle with the exterior surface of the ring to form a knife-like edge thereon.

2. A piston ring having: a plurality of substantially horizontal perforations extending radially therethrough; a circumferentially extending groove in its lower outer corner, said groove having an upper wall terminating at the outer periphery of said ring in an oil-scraping edge; and, having a plurality of holes extending inwardly from said groove and being inclined relative to said perforations, said perforations and holes being arranged in alternating relationship circumferentially of said ring and each having an outlet at the inner face of said ring in a zone substantially medial of the side faces of said ring.

PAT B. JOHNSON.